United States Patent
Scherr et al.

[11] Patent Number: 6,003,378
[45] Date of Patent: Dec. 21, 1999

[54] PRESSURE SENSOR USING ELEMENTS OPERATING WITH ACOUSTIC SURFACE WAVES (SAW ELEMENTS)

[75] Inventors: Holger Scherr; Gerd Scholl, both of Munich, Germany

[73] Assignee: Siemens Aktiengesellschaft, Munich, Germany

[21] Appl. No.: 08/928,928

[22] Filed: Sep. 12, 1997

[30] Foreign Application Priority Data

Sep. 13, 1996 [DE] Germany .......................... 196 37 392

[51] Int. Cl.⁶ .................................................. G01L 11/00
[52] U.S. Cl. ............................................................. 73/703
[58] Field of Search ................ 73/703, 723; 310/313 B, 310/313 D, 313 A

[56] References Cited

U.S. PATENT DOCUMENTS 4,382,386   5/1983   Coussot et al. .......................... 73/703
4,994,798   2/1991   McColl ............................... 310/313 D

OTHER PUBLICATIONS

IEEE Transactions on Ultrasonics Ferroelectrics and Frequency Control, vol. UFFC 34, No. 2, Mar. 1987, pp. 253–258.
1992 Ultrasonics Symposium pp. 147–150 (no month).
Fachhochschule Landshut–5 pages (no date).
IEEE Transactions on Sonics and Ultrasonics, vol. SU–20, No. 2, Apr. 1973 pp. 124–133.
1994 IEEE International Frequency Control Symposium pp. 345–351 (no mo.).
1994 IEEE International Frequency Control Symposium pp. 395–400 (no mo.).

*Primary Examiner*—William Oen
*Attorney, Agent, or Firm*—Hill & Simpson

[57] ABSTRACT

A pressure sensor with a reflective acoustic surface wave (SAW) delay line fashioned on a pressure-sensing membrane having at least three reflectors wherein the delay line extends over both an expanding region and a compressing region of the pressure-sensing membrane.

8 Claims, 1 Drawing Sheet

PRESSURE SENSOR USING ELEMENTS OPERATING WITH ACOUSTIC SURFACE WAVES (SAW ELEMENTS)

BACKGROUND OF THE INVENTION

1. Field of the Invention

The present invention is directed to a pressure sensor which uses elements operating with acoustic surface waves (SAW elements) wherein a reflective saw delay line with at least three reflectors is positioned on a pressure-sensing membrane such that it extends over both an expanding region and a compressing region of the membrane.

2. Description of the Prior Art

Pressure sensors of this generic type are known, for example, from the 1994 publication "IEEE International Frequency Control Symposium," pages 395–400. In a known SAW pressure sensor of this type, two SAW resonators are provided on a piezoelectric substrate fashioned as a pressure-sensing membrane; one sensor being arranged in the center of the pressure-sensing membrane and the other being arranged outside of such center. The two resonators are connected into the feedback loop of two oscillators wherein they serve as frequency control elements. The deformation that arises when pressure is exerted on the membrane causes changes in the mid-frequencies of the resonators. Since the resonance spaces of the resonators are located at points of opposite signs of the deformation, their respective frequency displacements likewise have different signs. The difference in frequency is the sum of the resonator frequency displacements. The measured pressure is a function of this difference in frequency and a function of the temperature. For the compensation of temperature changes, a thermoresistor is provided in addition to the SAW resonators.

Pressure sensors of this type require the incorporation of active electronic wiring of the SAW resonators for the realization of oscillators. In addition, pressure sensors of this type are not unproblemmatically remotely interrogatable. As such, the possibilities of their use are limited. For example, pressure sensors of this type can be used at wire bound points that are difficult to reach or that are completely inaccessible only with difficulty, if they can be used here at all.

SUMMARY OF THE INVENTION

The object of the present invention is to provide a passively constructed (i.e., without active electronic circuitry) pressure sensor of the aforementioned type which is also remotely interrogatable via radio. This object is achieved in a pressure sensor with a reflective SAW delay line positioned on a pressure-sensing membrane with at least three reflectors, wherein the delay line extends over both an expanding region and a compressing region of the pressure-sensing membrane.

In an embodiment, a piezoelectric substrate of the SAW delay line serves as the pressure-sensing membrane.

In an embodiment, a first reflector is arranged on the expanding region, a second reflector is arranged on the compressing region and a third reflector is arranged between the first and second reflectors.

In an embodiment, the third reflector is arranged on a neutral transition region between the expanding and compressing regions.

In an embodiment, a fourth reflector is arranged closely to either the first, second or third reflectors so that, given a maximum pressure, a phase displacement of at most 360° occurs between the acoustic surface waves reflected at these reflectors.

In an embodiment, the fourth reflector is arranged approximately in the center between two of either the first, second or third reflectors.

In an embodiment, the reflectors are arranged in a single acoustic track on the pressure-sensing membrane.

In an embodiment, the reflectors are arranged in at least two acoustic tracks on the pressure-sensing membrane and are coupled via a diverter.

In an embodiment, a sensor is remotely interrogatable via radio wherein an input/output interdigital converter is coupled to an antenna that receives an interrogation signal and radiates a response signal.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
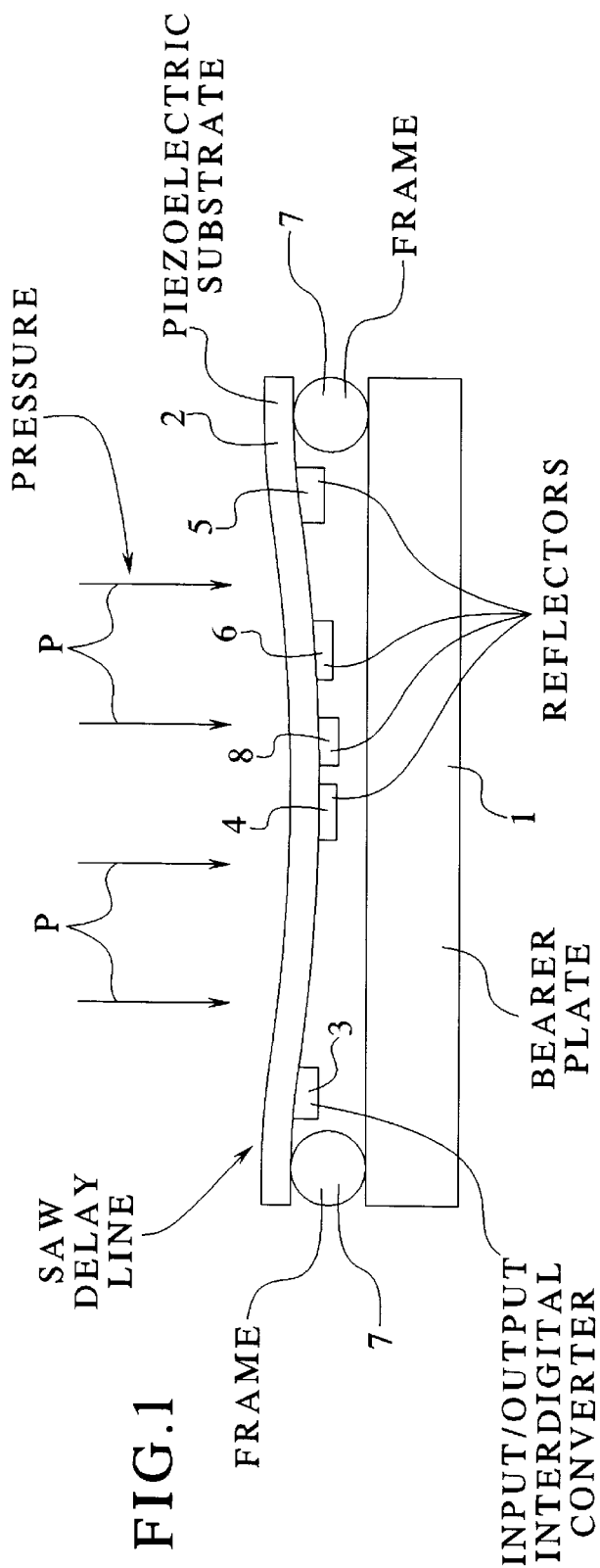
FIG. 1 shows a schematic representation of an embodiment of the pressure sensor of the present invention.

According to FIG. 1, a reflective SAW delay line is arranged on a bearer plate 1 over a frame 7. The bearer plate 1 may, for example, be made of quartz and the frame 7 may, for example, be formed by glass, solder or plastic. A piezoelectric substrate of the delay line 2 serves as a pressure-sensing membrane of the pressure sensor. A pressure acting on the pressure-sensing membrane 2 is schematically indicated by arrows P.

It is first briefly remarked that a reflective SAW delay line consists, in principle, of an input/output interdigital converter as well as at least one reflector. The input/output interdigital converter converts an electrical signal into an acoustic surface wave which runs into the reflector and is reflected back thereby to the input/output interdigital converter. This back-reflected acoustic surface wave is converted back into an electromagnetic signal by the input/output interdigital converter. The run time of the acoustic surface wave between the input/output interdigital converter and the reflector corresponds to the delay time of the reflective SAW delay line.

According to the present invention, the reflective SAW delay line in the pressure sensor of FIG. 1 is formed by the piezoelectric substrate 2, which simultaneously acts as a pressure-sensing membrane, an input/output interdigital converter 3 and at least three reflectors 4, 5 and 6. In addition, one of the reflectors (in FIG. 1, the reflector 4) is arranged in an expanding region and a further reflector (in FIG. 1, the reflector 5) is arranged in a compressing region of the pressure-sensing membrane 2. A further reflector 6 divides the run path of the reflective SAW delay line into expanding and compressing sections. This reflector 6 is preferably arranged in a neutral transition region between the expanding region and the compressing region of the pressure-absorbing membrane 2. During the evaluation of pressure, the run times or the phases of the expanding sections are subtracted in weighted fashion from the phases of the compressing sections. Simultaneous temperature effects are thereby eliminated and, in addition, linearity errors are reduced. The phase differences caused by the pressure are added according to the absolute value so that the sensitivity to pressure increases.

An inventively constructed SAW pressure sensor also can be easily remotely interrogated via radio in a passive arrangement without the incorporation of additional active electronic circuitry. Such arrangement includes feeding an interrogation signal into the input/output interdigital converter 3 via an antenna and thereafter radiating the delayed signal from the input/output interdigital converter 3 via the antenna. Since reflective SAW delay lines are broad-banded in principle, a signal transmission via radio is also possible in environments with a high degree of disturbance. Further, since the reflector 4 marks the beginning, sensor response becomes independent from the distance to an interrogation apparatus.

In order to avoid possible phase ambiguities in the sensor signal, a further construction of the invention provides an additional reflector which is arranged so closely to one of the reflectors already disclosed that a phase displacement of at most 360° occurs between it and this adjacent reflector, given the maximum pressure to be detected acting on the pressure sensor. This arrangement enables a phase-unambiguous evaluation of the signal portions from the reflectors which are arranged in both the expanding and the compressing regions of the pressure-sensing membrane. In the exemplary embodiment shown in FIG. 1, a reflector 8 of the type herein explained is arranged adjacent to the reflector 4. In a modification of this arrangement, the reflector can also be arranged approximately in the middle between the reflectors 4 and 6, whereby phase ambiguities likewise can be eliminated.

Figure 2:
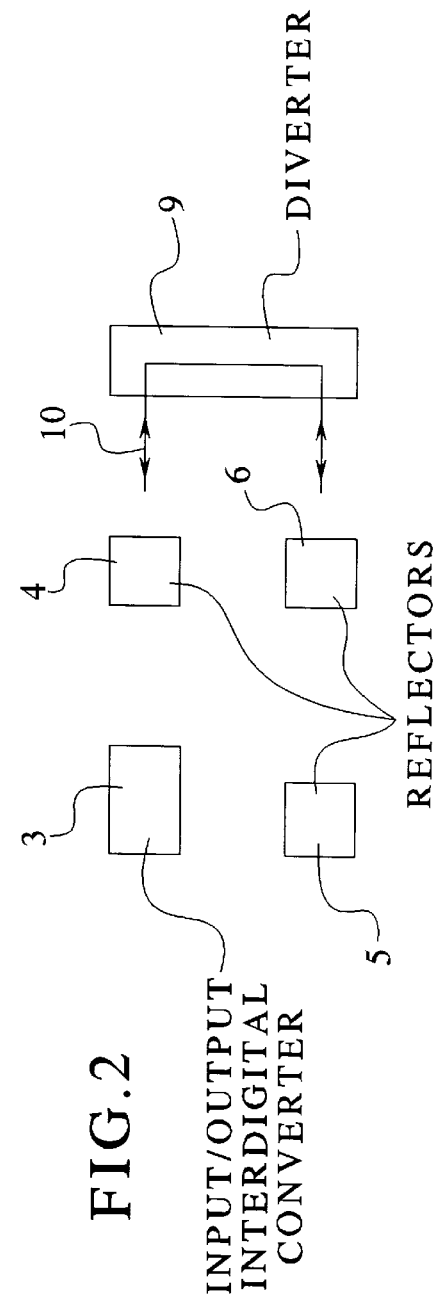
FIG. 2 shows a specific construction, in block diagram form, of a SAW delay line that can be used in a pressure sensor according to FIG. 1.

In the exemplary embodiment shown in FIG. 1, it is assumed that the components of the reflective SAW delay line, i.e., the input/output interdigital converter 3 and the reflectors 4, 5, 6 and 8 are arranged in a single acoustic channel. In order to achieve a reduction in size of the pressure-sensing membrane 2, the components of a reflective SAW delay line also can be arranged in channels differing from one another; for example, acoustic channels connected in series. An embodiment of the present invention exemplifying this arrangement is shown in FIG. 2, wherein elements identical to those in FIG. 1 are provided with the same reference characters. As shown in FIG. 2, reflectors 4, 5 and 6 are arranged in two acoustic channels acoustically coupled with one another via a diverter 9. The curve of the acoustic wave portions is schematically indicated in FIG. 2 by means of a line 10 provided with arrows. In an arrangement of this sort, the run time, and thereby also the sensor effect, remains the same despite a possible reduction of the surface area of the pressure-sensing membrane.

Although the present invention has been discussed with reference to specific embodiments, those skilled in the art will recognize that changes may be made thereto without departing from the spirit and scope of the invention as set forth in the hereafter appended claims.

We claim as our invention:

1. A pressure sensor, comprising:

a pressure-sensing membrane having an expanding region and a compressing region;

a reflective acoustic surface wave delay line on the pressure-sensing membrane, the delay line extending over both the expanding region and the compressing region and being the only delay line of the pressure sensor;

a first reflector arranged in the expanding region of the pressure-sensing membrane;

a second reflector arranged in the compressing region of the pressure-sensing membrane: and a third reflector arranged between the first reflector and the second reflector.

2. A pressure sensor as claimed in claim 1, further comprising:

a piezoelectric substrate as the pressure-sensing membrane.

3. A pressure sensor as claimed in claim 1, wherein the third reflector is arranged in a neutral transition region between the expanding region and the compressing region of the pressure-sensing membrane.

4. A pressure sensor as claimed in claim 1, further comprising:

a fourth reflector arranged closely to one of the at least three reflectors on the delay line wherein, given maximum pressure, a phase displacement of at most 360° occurs between acoustic surface waves reflected at the fourth reflector and the one of the at least three reflectors.

5. A pressure sensor as claimed in claim 1, further comprising:

a fourth reflector arranged approximately in the center between two of the at least three reflectors.

6. A pressure sensor as claimed in claim 1, wherein the at least three reflectors on the delay line are arranged in a single acoustic track on the pressure-sensing membrane.

7. A pressure sensor as claimed in claim 1, wherein the at least three reflectors on the delay line are arranged in at least two acoustic tracks on the pressure-sensing membrane, the at least two acoustic tracks coupled with a diverter.

8. A pressure sensor as claimed in claim 1, further comprising:

an input/output interdigital converter on the delay line, the converter coupled to an antenna that receives an interrogation signal via radio and radiates a response signal thereto.

\* \* \* \* \*